April 18, 1961 I. LUIK 2,980,895
GYROSCOPE MONITORING ALARM SYSTEM
Filed Dec. 22, 1958
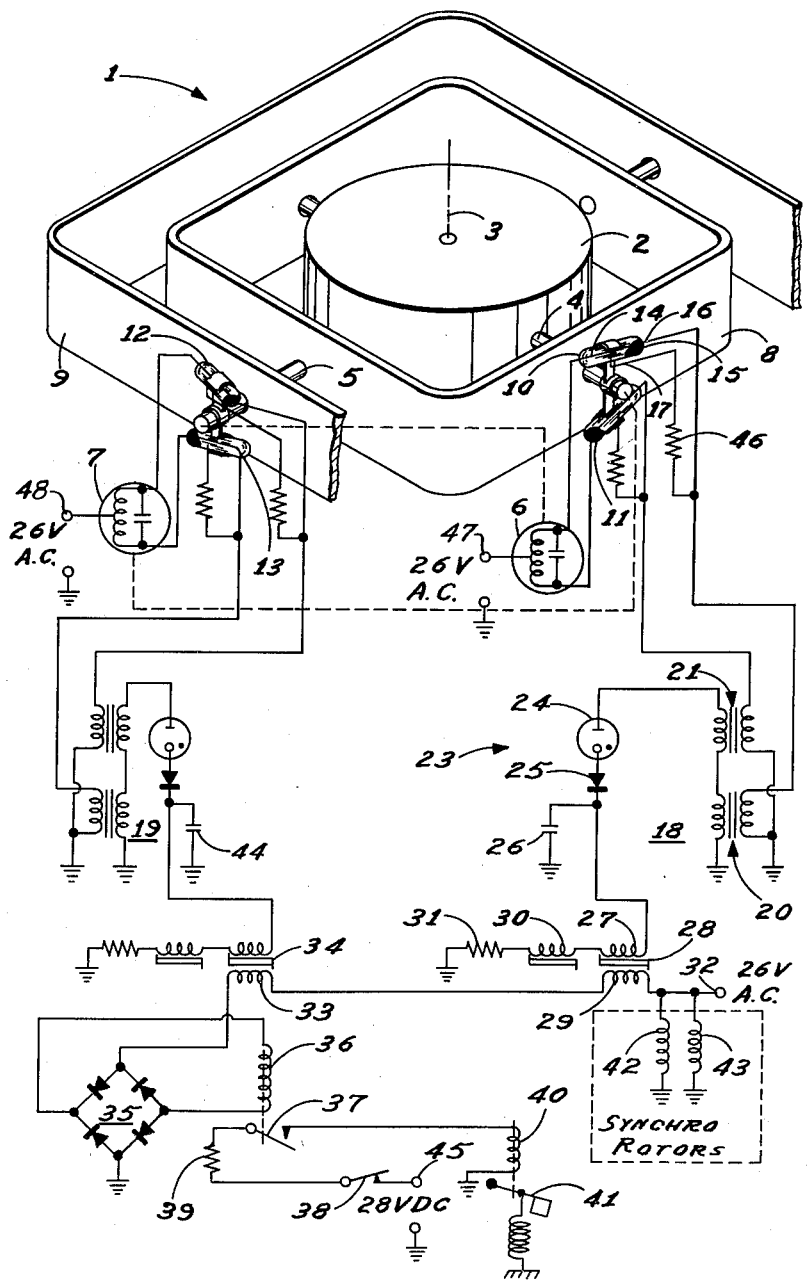
INVENTOR.
ILMAR LUIK
BY
ATTORNEY
AGENT

United States Patent Office 2,980,895
Patented Apr. 18, 1961

2,980,895

GYROSCOPE MONITORING ALARM SYSTEM

Ilmar Luik, Cedar Rapids, Iowa, assignor to Collins Radio Company, Cedar Rapids, Iowa, a corporation of Iowa Filed Dec. 22, 1958, Ser. No. 782,045

3 Claims. (Cl. 340—213)

This invention relates to monitoring alarm systems for gyroscopes such as used in navigational systems to indicate that an erection means has failed to maintain the spin axis of the gyroscope in a predetermined attitude. This alarm system provides more thorough monitoring than that provided by previous systems and has a simple flag indicator that may be a part of the usual type of navigational display instruments.

An object of this invention is to provide a monitoring system that actuates an alarm device within a predetermined interval after the erection means of a navigational system fails.

Another object is to provide a positive operating simple alarm indicator that operates in response to actuation of the usual switches for controlling erection motors of the gyroscope.

A feature of the invention provides instant alarm indication in response to interruption of voltage that is also applied to the attitude sensing elements of the gyroscope.

In the system shown in the accompanying figure, two individual delay control circuits are coupled to corresponding erection motor control circuits that are associated with the two different mounting axes of the gyroscope gimbal. Each delay control circuit includes a capacitor that is normally charged when the motor control switches are in a position that is normal in response to the spin axis of the gyroscope being in a desired attitude. When the spin axis departs from the desired attitude, one or both of the erection motors normally operate immediately to return the spin axis to its proper attitude. During the interval that is usually required for returning the spin axis, a charging voltage is removed from that capacitor which is in that delay circuit corresponding to the motor which is in operation. Upon removal of the charging voltage, the capacitor commences to discharge through an input circuit of a current control circuit of the alarm indicator. The alarm indication is delayed by the discharge current from the capacitor so that normally there is sufficient time for the erection motor to return the spin axis to its normal attitude and thereby prevent operation of the alarm indicator. Should there be a malfunctioning of the erection circuit so that the return of the spin axis is delayed more than that interval required for discharging one of the capacitors, a red flag or other alarm indicator is operated.

The flag being used as an alarm indicator is constantly urged by spring tension into full view to indicate alarm. A flow of current to the flag operating circuit is required to maintain the flag out of sight to prevent an indication of malfunctioning. When the same source of current is connected to both the flag control circuit and to the positioning sensing elements, a normal indication assures that the source of current for the sensing elements is operative.

More particularly, with reference to the accompanying drawing, gyroscope 1 is of conventional construction having a rotor 2 with spin axis 3. The rotor of the gyroscope is mounted in the usual gimbal that has trunnions 4 and 5 on axes that are perpendicular to each other and perpendicular to the spin axis 3. The spin axis 3 is maintained in a vertical position by operation of erection motors 6 and 7. Erection motor 7 is effective in applying torque between the inner ring 8 of the gimbal and trunnion 4 and likewise, erection motor 6 is effective in applying required torque between the outer ring 9 of the gimbal and the trunnion 5. The erection motors are the alternating-current capacity type that lack torque when the current through two portions of the motor windings are equal but provide torque when the current through the two portions of the motor windings are unequal, the direction of the torque being reversed as the greater current flow is transferred from one portion of the winding to the other.

Current for torque motor 6 is controlled by gravity-operated mercury switches 10 and 11 that are mechanically coupled to trunnion 4 and likewise current for torque motor 7 is controlled by gravity-operated mercury switches 12 and 13 that are coupled to trunnion 5. When spin axis 3 is vertical, the switches are closed, but when the spin axis is tilted with respect to either mounting axis by more than 5 degrees from vertical, one of the switches mounted about that axis is opened. The direction of the tilt about the axis determines which switch is opened; the other switch on the same axis is opened in response to a tilt greater than 5 degrees in the opposite direction. The operation of gravity switches for controlling a torque motor is described in U.S. Patent 2,474,549 entitled "Gyroscope," issued to John F. Schoeppel on June 28, 1949.

Each of the switches shown in the accompanying figure have two contacts that are individually closed to a common contact in response to different degrees of tilt of the switch. For example, in switch 10 common contact 14 is normally connected through mercury globule 15 to contact 16 when the switch is in a normal position for indicating a vertical position; the common contact is connected to contact 17 in response to a tilt of 2.5 degrees from its normal position; and the switch is completely open in response to a tilt greater than 5 degrees. The erection motors operate at one rate for a tilt greater than 5 degrees and at a slower rate for a tilt less than 2.5 degrees.

The alarm circuit of the present invention has delay control circuits 18 and 19 connected individually to the pairs of switches for controlling erection motors 6 and 7 respectively. With reference to that circuit connected to erection motor 6, primary windings of step-up transformers 20 and 21 are connected between ground and switches 10 and 11 respectively. When the spin axis is in a normal vertical attitude with reference to trunnions 5, current flows from source 47 of alternating-current through parallel circuits comprising two portions of the winding of erection motor 6 through closed switches 10 and 11 and primary windings of transformers 20 and 21 respectively. The secondary windings of transformers 20 and 21 are connected in series so that the voltages induced into the secondary windings from the primary windings are added and applied across a delay control circuit 23. The delay control circuit comprises electron discharge device 24 connected in series with a diode rectifier 25 and capacitor 26. A discharge circuit connected across capacitor 26 comprises the primary winding 27 of transformer 29 that has a saturable core, choke 30 that also has a saturable core, and resistor 31 connected in series. When the spin axis 3 of rotor 2 is vertical so that both switches 10 and 11 are closed, the sum of the voltages that are induced into the secondary windings of transformers 20 and 21 is maximum and causes the discharge tube 24, which may be a neon glow tube, to break down and apply voltage to serially connected rectifier 25 and capacitor 26. Likewise, when the spin axis 3 of rotor 2 is in a normal vertical attitude with respect to trunnion 4, current flows from source 48 through parallel windings of motor 7 for applying maximum voltage to capacitor 44.

In response to departure of the spin axis from vertical relative to trunnion 5, the voltage that is induced into the serially connected secondary windings of transformers 20 and 21 is reduced below that point required for maintaining discharge tube 24 conductive and, therefore, capacitor 26 commences to discharge through primary winding 27 of saturable inductor 28, the winding of saturable choke coil 30, and resistor 31. As long as substantial discharge current flows through the primary winding 27, the impedance of the secondary winding 29 of saturable reactor 28 is sufficiently low to maintain the required current flow necessary to retain the alarm indicator in a condition that indicates normal operation. Ordinarily the spin axis 3 of gyroscope rotor 2 will be returned to its vertical position by operation of erection motor 6 before capacitor 26 is sufficiently discharged to cause an alarm indication.

It is evident that in the event the erection motor is unoperative, and, therefore, unable to return the spin axis to its vertical position, capacitor 26 will become discharged to the point that the current flow through winding 27 of reactor 28 is insufficient to saturate the core of the reactor. Therefore, the impedance of secondary winding 29 increases sufficiently to greatly reduce the current flow to the operating circuit of the alarm indicator. The alarm indicator responds to the substantial reduction of current to indicate failure. Should a connection in the operating circuit of the erection motor 6 become open or should the winding itself of the motor become open, capacitor 26 will discharge to cause a failure indication even though spin axis 3 is vertical.

The operating circuit of the flag alarm includes terminal 32 that is connected to a source of alternating current, secondary winding 29 of saturable reactor 28 that is connected for monitoring the operation of erection motor 6, secondary winding 33 of saturable reactor 34 that is connected to the circuit for monitoring erection motor 7, full wave rectifier 35, and relay winding 36. Normally the voltage across capacitor 26 of delay control circuit 18 and the corresponding capacitor 44 of delay control circuit 19 is sufficient to maintain the cores of reactors 28 and 34 saturated. The total impedance of serially connected windings 29 and 33 of the saturated reactors is low to allow sufficient alternating-current flow to rectifier 35 for maintaining the required direct-current flow from the output of the rectifier to hold relay 36 operated. The operating circuit for energizing the winding of solenoid 40 to retain alarm flag 41 in a normal position may be traced from terminal 45 that is connected to a source of direct-current voltage, through limit switch contacts 38 that are normally closed in response to the rotor of gyroscope 1 being uncaged, limiting resistor 39, contacts 37 of relay 36, and through winding 40 to ground.

When either capacitor 26 or 44 have discharged below a certain point, the impedance of the respective saturable reactor load winding 29 or 33 increases substantially and thereby causes sufficient reduction in current flow through solenoid winding 40 to allow flag 41 to be operated either by force from a spring or by gravity to that position for indicating alarm. Since the removal of voltage from terminal 32 causes an immediate alarm signal, this voltage is constantly monitored and indicates that normal voltage is available to any circuits that are connected to this same source; for example, synchro rotors 42 and 43 that may be coupled to gyroscope 1 for indicating the attitude of the gyroscope mounting base relative to the vertical spin axis 3.

Specifically, with regard to one model of an automatic pilot for aircraft navigation, the discharge device 24 is a neon glow tube that ionizes in response to the application of approximately 60 alternating-current volts to the delay control circuit. Transformers 20 and 21 have the proper step-up ratio for applying approximately 80 alternating-current volts to the delay control circuit 23 in response to the erection motor 6 being connected directly to the transformers through closed gravity-operated mercury switches 10 and 11. When either of these switches is open, the alternating-current voltage that is applied to the delay control circuit drops to 40 volts and tube 24 becomes nonconductive. The capacitor 26 as well as the corresponding capacitor 44 has a capacitance of 80 microfarads and discharges through a circuit that includes resistor 31 which has a resistance of 100,000 ohms. These values provide sufficient current during an interval four times as long as the time constant of the discharge circuit for maintaining sufficiently low impedance across the secondary windings of reactors 28 and 34 to maintain the flag alarm in a normal position. Resistor 46 that is shown connected to contact 17 of gravity-operated mercury switch 10 completes a circuit for the erection motor when the spin axis 3 is within about 2.5 degrees of vertical and causes the erection motor to operate at a slower speed than at that speed at which it operated when the switch 10 is completely open. While the operating circuit is being completed through resistor 46, the voltage that is applied to delay control circuit 23 is sufficient for ionizing discharge tube 24 so as to prevent an alarm indication.

Although this invention has been described with respect to a particular embodiment shown in the accompanying figure, the alarm circuit may be modified in ways obvious to those skilled in the art and still be within the spirit and scope of the following claims.

What is claimed is:

1. A failure alarm for a gyroscope, said gyroscope being of the type having a rotor with a spin axis oriented in a predetermined attitude, a plurality of electrical switches, an erection motor, each of said switches being connected in series in an operating circuit for said motor, different ones of said switches being operable from a normal closed position in response to departure of said spin axis in different directions about an axis of said rotor to open said respective operating circuit, said failure alarm comprising an alarm signaling device, a capacitor, means responsive to all of said operating circuits of said motor being normally closed for applying across said capacitor direct-current voltage higher than a first predetermined voltage, means responsive to any of said motor operating circuits being opened for removing said direct-current voltage in order to allow discharge of said capacitor, said signaling device being disabled for indicating alarm by the presence across said capacitor of voltage higher than a second predetermined voltage which is lower than said first predetermined voltage, said signaling device after an interval that is determined by the discharge rate of said capacitor operating to indicate faulty operation of said gyroscope, and said signaling device continuing to be disabled to prevent an alarm indication in response to all of said operating circuits being normally completed during said interval.

2. A failure alarm for a gyroscope comprising, a pair of erection current control circuits including transformer means, each of said erection current control circuits conducting normal current in response to the spin axis of said gyroscope having a predetermined attitude, an alarm control circuit including a discharge tube, a rectifier and a capacitor connected in series, said discharge tube becoming conductive in response to the application of voltage higher than a first predetermined voltage across said alarm control circuit, said transformer means in response to the normal flow of current in each of said erection current control circuits applying voltage higher than said first predetermined voltage across said alarm control circuit for charging said capacitor, an alarm signaling device connected to the output of said capacitor, said signaling device providing a normal indication in response to the voltage across said capacitor being greater than a second predetermined voltage which is lower than said first predetermined voltage, said discharge tube becoming nonconductive in response to the departure of said spin axis from said predetermined attitude to disconnect said capacitor from said transformer means for discharging said capacitor at said discharge rate, said signaling device being operated to give an alarm indication in response to the voltage across said capacitor becoming less than said second predetermined voltage within an interval determined by said discharge rate, and said signaling device being retained unoperated to prevent an alarm indication in response to the spin axis of said gyroscope being returned to its predetermined attitude within said interval.

3. A failure alarm for a gyroscope, said gyroscope being of the type having a rotor with a spin axis oriented in a predetermined attitude, said rotor being mounted for allowing rotation of said spin axis about first and second perpendicular mounting axes, first and second torque motors operable for rotating said rotor about said first and second mounting axes respectively, first and second pairs of switches for controlling operation of said first and second motors and operable in response to rotation of said spin axis about said first and second mounting axes respectively, said switches normally being closed, different ones of said switches being opened in response to rotation of said spin axis in different directions from said predetermined attitude about respective ones of said axis; said failure alarm comprising first and second transformers having primary windings connected through said first and second pairs of switches to said first and second motors respectively, first and second delay control circuits connected across individual secondary windings of said first and second transformers respectively, each of said delay control circuits having a discharge tube, a rectifier and a capacitor serially connected, each of said discharge tubes becoming conductive in response to the application of voltage higher than a first predetermined voltage to said alarm control circuit, means for applying through each of said transformers and a respective pair of said switches voltage higher than said first predetermined voltage to the respective one of said discharge tubes in response to the respective pair of said switches being normally closed, each of said capacitors becoming charged to said higher voltage in response to the respective one of said discharge tubes becoming conductive, a saturable reactor and a resistor for each of said delay control circuits, each saturable reactor having a control winding and a load winding, said control winding and said resistor for each delay control circuit being connected in series to form a discharge circuit across the respective one of said capacitors, a source of alternating current, an alarm signaling device, said source of alternating-current, each of said load windings, and the input circuit of said alarm signaling device being connected in series, the impedance of said load windings normally being of such low value that sufficient current flows through said input circuit to maintain said signaling device in a nonalarm state, said discharge tube for either delay control circuit becoming non-conductive in response to one of said switches that is connected through a respective one of said transformers to a respective delay control circuit being opened by departure of said spin axis from said predetermined attitude to start discharging of a respective capacitor at a rate determined by the resistance of said discharge circuit, the impedance of the load winding of said saturable transformer that is connected to said discharging capacitor increasing in response to the decreasing discharge current to operate said signaling alarm device within a predetermined interval after the respective one of said discharge tubes becomes nonconductive, and said signaling alarm device being retained in it nonalarm state providing the spin axis of said gyroscope is returned to its predetermined attitude within said interval.

References Cited in the file of this patent
UNITED STATES PATENTS 2,745,091    Leffler    May 6, 1956
2,831,181    Warner    Apr. 15, 1958